United States Patent
Eran

(10) Patent No.: US 7,269,252 B2
(45) Date of Patent: Sep. 11, 2007

(54) METHOD AND APPARATUS FOR IMPROVING NUISANCE SIGNALS IN AUDIO/VIDEO CONFERENCE

(75) Inventor: Knaz Eran, Rishon LeZion (IL)

(73) Assignee: Polycom, Inc., Pleasanton, CA (US)

( * ) Notice: Subject to any disclaimer, the term of this patent is extended or adjusted under 35 U.S.C. 154(b) by 786 days.

(21) Appl. No.: 10/636,909

(22) Filed: Aug. 6, 2003

(65) Prior Publication Data

US 2005/0069114 A1 Mar. 31, 2005

(51) Int. Cl.
*H04M 2/42* (2006.01)
(52) U.S. Cl. .......................... 379/202.01; 379/203.01; 379/204.01; 379/206.01; 379/215.01; 379/158; 379/88.16
(58) Field of Classification Search ........... 379/202.01, 379/203.01, 204.01, 206.01, 215.01, 158, 379/88.16
See application file for complete search history.

(56) References Cited

U.S. PATENT DOCUMENTS

| | | | |
|---|---|---|---|
| 4,672,669 A | 6/1987 | DesBlache et al. ............ 381/46 |
| 5,548,638 A | 8/1996 | Yamaguchi et al. ......... 379/202 |
| 6,349,136 B1 | 2/2002 | Light et al. ............. 379/202.01 |
| 6,353,662 B1 | 3/2002 | Foladare et al. ........ 379/101.01 |
| 6,556,670 B1 | 4/2003 | Horn ...................... 379/202.01 |
| 6,870,807 B1 * | 3/2005 | Chan et al. .................. 370/201 |
| 2003/0128830 A1 | 7/2003 | Coffman et al. ........ 379/202.01 |
| 2004/0218553 A1 | 11/2004 | Friedrich et al. ............ 370/260 |

FOREIGN PATENT DOCUMENTS

| EP | 0 982 920 | 3/2000 |
|---|---|---|
| EP | 1 392 043 | 2/2004 |

OTHER PUBLICATIONS

European Search report received in copending European patent application dated Apr. 15, 2005.
European Search Report dated Nov. 15, 2004.

* cited by examiner

*Primary Examiner*—Quynh H. Nguyen
(74) *Attorney, Agent, or Firm*—Wong, Cabello, Lutsch, Rutherford & Brucculeri, LLP

(57) ABSTRACT

A system to allow a conferee defined as a nuisance source to respond to an automatic nuisance decision of a Multipoint Control Unit is disclosed. For example, a conferee placing a conference on hold may generate on hold music, which may be identified by a nuisance detector. The nuisance detector sends an indication of the nuisance condition to a control unit in the MCU. The control unit mutes the signal coming from this conferee and sends an Interactive Voice Response (IVR) message to the conferee. The message may inform the conferee that he has been muted and requests the conferee for example to press one of a plurality of touch tone keys depending on his situation. For instance, the conferee can select particular keys if he is returning from the hold condition, if he is experiencing a noisy line/environment and needs to reduce the sensitivity of the nuisance detector algorithm, or if he wishes to disable the nuisance detector algorithm.

36 Claims, 4 Drawing Sheets

METHOD AND APPARATUS FOR IMPROVING NUISANCE SIGNALS IN AUDIO/VIDEO CONFERENCE

BACKGROUND

1. Field of Invention

The present invention relates to the field of multipoint audio/video conferences, and more particularly to improving the quality of the conference by reducing nuisance signals.

2. Description of Background Art

Multipoint conferences of audio, video, and/or multimedia involve communication between more than two participants. Commonly, conference calls may be established over a communications network, such as the Public Switched Telephone Network ("PSTN"), an Integrated Services Digital Network (ISDN), an Internet Protocol (IP) network, etc. The network contains Multipoint Control Units (MCU) and/or audio bridges that route and compose the communications of the participants in the call. The operation of MCUs and audio bridges are well known to those skilled in the art, and exemplary audio bridges are disclosed in U.S. patent application Ser. Nos. 10/072,081 and 10/144,561, the contents of which are incorporated herein by reference. It should be noted that the terms "MCU" and "audio bridge" may be used interchangeably herein.

A common MCU may receive audio signals from a plurality of conferees, analyze the signals and create control information such as, but not limited to, VAD (Voice Activity Detection), signal energy, and signal quality measures. Based on the control information, decisions may be made regarding whose signals will be mixed and distributed among the other conferees, or whose signal will be muted due to a conclusion that the signal is below acceptable quality. Un-Acceptable Signal (UAS) is an objective criteria and may depend on the type of the conference. Exemplary criteria may be non-voice signals such as: music, DTMF, background noise, etc. The terms "noisy signal," "nuisance," and "UAS" may be used interchangeably, and the term "nuisance" may denote all of these terms.

There are known methods for generating information regarding signal energy, VAD, and quality. Exemplary algorithms for creating such information are disclosed in G723.1 (used in Annex A for the same standard); G729.1 Annex B; and GSM AMR (GSM 06.71) using the VAD algorithm GSM 06.94. A simple algorithm for a Nuisance Detector (ND) may define a signal as "nuisance" when the signal energy (SE) is above a certain level, while the VAD indicates that the signal is not voice.

The quality of a conference depends on the automatic decisions made by such methods. For example, a sensitive ND algorithm may disconnect a valid participant, while a less sensitive algorithm may add a noisy connection to the conference mix, i.e., the composed audio signal of the selected conferees. The selection is based on the conference setup parameters and on the automatic decisions made from analyzing the signals of the current speakers. There are cases where an automatic decision may frequently reach an erroneous result. For example, in the case where a conferee places the conference call on hold and accepts another call, the private branch exchange (PBX) to which the conferee is connected may play "music on hold" over the conferee's connection, disturbing the rest of the conference's participants. "Music on hold" may be music, broadcast radio, advertising or other signals to the on-hold conferee. Generally "music on hold" may have the same properties as speech and therefore it may pass the criteria of common VAD and/or ND algorithms and therefore may erroneously be transmitted to the other parties in the conference. On the other hand, a sensitive ND that is not properly tuned to the connection quality of a certain conferee may harm/disconnect a valid conferee. Therefore, it is difficult to pre-tune the ND algorithm to different conferee's conditions.

Thus, it is evident that current technologies of automatic nuisance detection in audio/video conferencing may make wrong decisions that reduce the quality of the conference. Therefore, there is a need in the art for a new nuisance detection method to overcome these deficiencies.

SUMMARY OF THE INVENTION

Systems according to the present invention solve the above-described problem by providing a path to a conferee defined as a nuisance source by the MCU to respond to this determination and to correct or adjust/tune the ND according to his/her audio signal.

For example, in a telephone conference, in which at least one of the conferees may be connected to the conference via a PBX, the conferee may place the conference on hold, forcing a nuisance signal over the connection to the conference. The ND may then identify this connection as a nuisance connection and send this indication to an exemplary control unit in the MCU. The control unit upon receiving an indication that the conferee channel is a nuisance may mute the signal coming from this conferee. Then the exemplary controller may place an Interactive Voice Response (IVR) message over the audio signal to the conferee. An exemplary message may inform the conferee that he has been muted and request the conferee to press one of the touch tone keys, for instance, '1' if he is returning from being on hold, '3' if the conferee is using/within a noisy line/environment, or '5' to disable the ND algorithm, etc., and as explained further below.

If a response is not received from the conferee, the message may continue for a certain period or for the rest of the conference. By contrast, if an appropriate key has been pressed, the system according to the present invention may act as follows. In an exemplary embodiment, if '1' is pressed, muting of the conferee is canceled and the conferee can be heard. If '3' is pressed, the sensitivity of the ND algorithm is reduced, allowing the control unit to enable the conferee to be heard in the conference while keeping a record of this adjustment. If '5' is pressed, the ND algorithm may be disabled to allow the nuisance conferee to be connected without condition.

Other exemplary embodiments may request, using an IVR message, from another conferee, for example the chairman of the conference, to decide whether to mute the noisy conferee or not.

Other exemplary embodiments may place a noisy conferee in push to talk (PTT) operation, thereby instructing the noisy conferee, using an IVR message, to momentarily push any one of the keys each time he wishes to talk and to push again when he is finished speaking.

In general, systems according to the present invention may use means other than DTMF feedback to allow the conferee to respond, such as but not limited to, voice recognition, network control signals such as ISDN 'D' channel, control packets over IP communication, etc.

Thus, systems according to the present invention advantageously offer an improved algorithm that handles nuisances in conferences by requesting feedback from the nuisance conferees. The feedback from the noisy conferee may correct the automatic decision and therefore improve the quality of the conference.

Other features and advantages of the present invention will become apparent upon reading the following detailed description of the embodiments with the accompanying drawings and appended claims.

DETAILED DESCRIPTION OF THE PREFERRED EMBODIMENT

Turning now to the figures in which like numerals represent like elements throughout the several views, exemplary embodiments of the present invention are described. For convenience, only some elements of the same group may be labeled with numerals. The purpose of the drawings is to describe exemplary embodiments and not for production. Therefore features shown in the figures are chosen for convenience and clarity of presentation only.

Figure 1A:
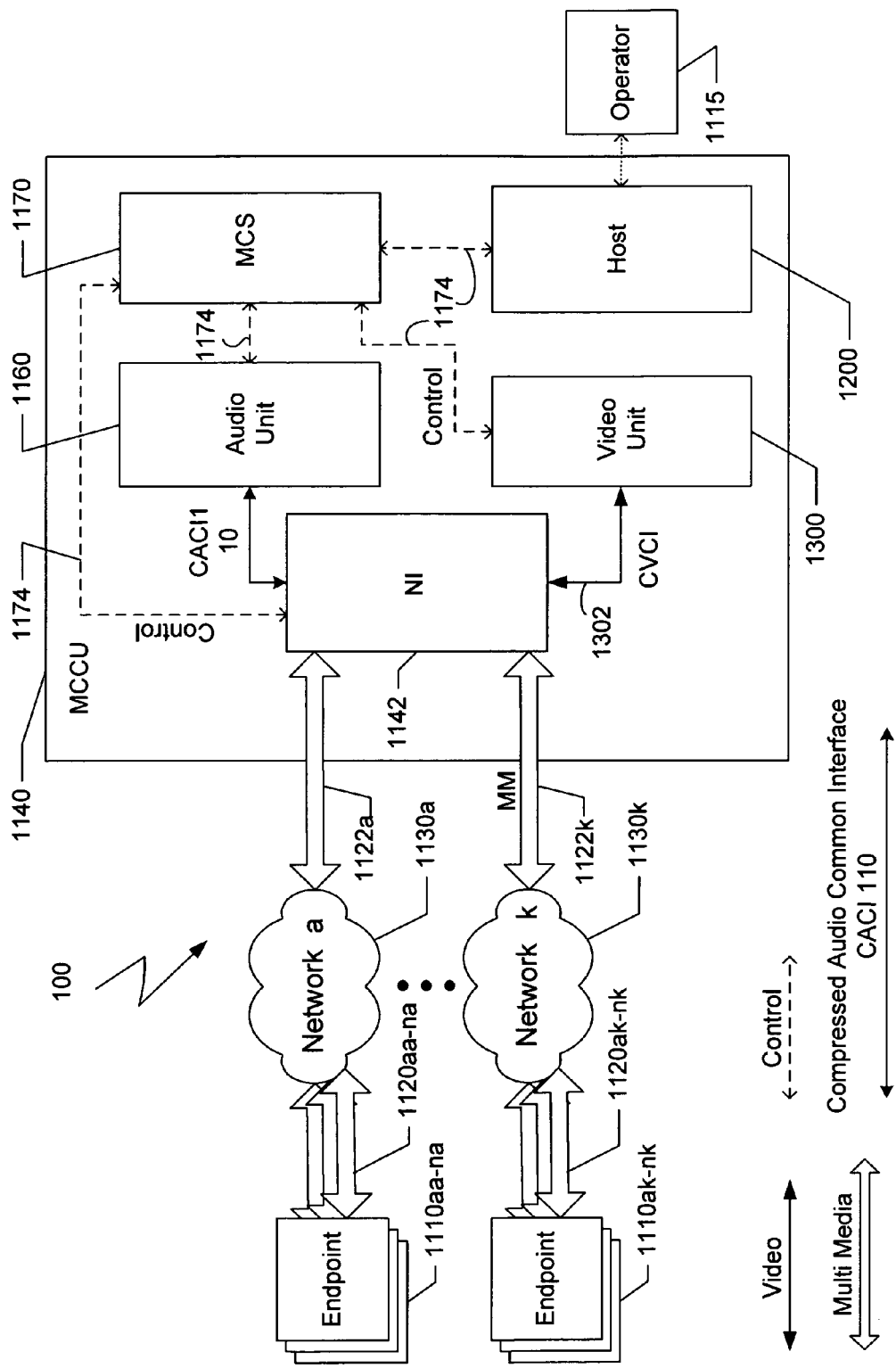
FIG. 1A is a block diagram showing an exemplary conference environment.

FIG. 1A is an exemplary block diagram illustrating a general description of a conference environment 100. The conference environment may have endpoints 1110aa-nk, an operator 1115, multimedia communications 1120aa-nk and 1122a-k, networks 1130a-k, and a Multimedia Conference Control Unit (MCCU) 1140. In one exemplary embodiment, the MCCU 1140 may include at least one Network Interface (NI) 1142, a Compressed Audio Common Interface (CACI) 110, an audio unit 1160, a Management and Control System (MCS) 1170, control signals 1174, a host 1200, and a video unit 1300. Other exemplary embodiments may not have a video section and may be used for audio conferences only. MCCU 1140 may handle a nuisance conferee by using embodiments according to the present invention.

The pluralities of endpoints 1110aa-nk are connected via the plurality of networks 1130a-k to the MCCU 1140. The MCCU 1140 may be an MCU, or an audio only multipoint control unit (an audio bridge), for example. The MCCU 1140 and/or some or all of its components are logical units that may be implemented by hardware and/or software. The MCS 1170 may be a control module and may be a logical unit that controls the operation of the MCCU 1140.

An endpoint is a terminal on a network capable of providing one-way or two-way audio and/or visual communication with other terminals or with the MCCU 1440. The information communicated between the terminals and/or the MCCU 1440 may include control signals, indicators, audio information, video information, and data. A terminal may provide any combination of several different types of inputs and/or outputs, such as speech only, speech and data, a combination of speech and video, or a combination of speech, data, and video. In the case of audio conference, the endpoint may be a common telephone, cellular telephone, etc.

The NI 1142 receives multimedia communications 1122a-k via networks 1130a-k and multimedia communications 1120aa-nk from the endpoints 1110aa-nk, and processes the media communication according to communication standards that are used by each type of network, such as, but not limited to, H.323, H.321, H.324, H.324M, H.320, SIP, ISDN, PSTN, etc. The NI 1142 then delivers compressed audio, compressed video, compressed data, and control streams to appropriate logical modules in the MCCU 1140. Some communication standards require that the process of the NI 1142 include demultiplexing the incoming multimedia communication into compressed audio, compressed video, compressed data and control streams. In the opposite direction, the NI 1142 receives the separate streams from the various units (e.g., the MCS 1170, audio unit 1160, and/or video unit 1300) and processes the streams according to the appropriate communication standard. The NI 1142 then transmits the streams to the appropriate network 1130a-k.

The audio unit 1160 receives the compressed audio streams of the plurality of endpoints 1110aa-nk via NI 1142 and CACI 110, processes the audio streams, mixes the relevant audio streams, and sends the compressed mixed signal via the Compressed Audio Common Interface (CACI) 110 and the NI 1142 to the endpoints 1110aa-nk. Audio unit 1160 may be a logical unit and is described below with respect to FIG. 1B.

The video unit 1300 may be a logical unit that receives and sends compressed video streams. The video unit 1300 includes at least one video input module that handles an input portion of a video stream 1302 from a participating endpoint and at least one video output module that generates a composed compressed video output stream that is sent via Compressed Video Common Interface (CVCI) 1302 to NI 1142 and from there to the designated endpoints 1110aa-nk. An exemplary operation of such a video unit is described in U.S. Pat. No. 6,300,973, which is incorporated herein by reference. The video unit is not mandatory for the operation of the present invention, as the present invention may be used by a MCCU that does not have a video unit, such as an audio bridge.

Preferably, the host 1200 communicates with the operator 1115 of the MCCU 1140, where the operator 1115 may have an operator's station for communicating with the host 1200. The host 1200 controls the MCCU 1140 via the MCS 1170 according to instructions from the operator 1115. However, the operator 1115 is not mandatory, as the MCCU may operate automatically without an operator.

Figure 1B:
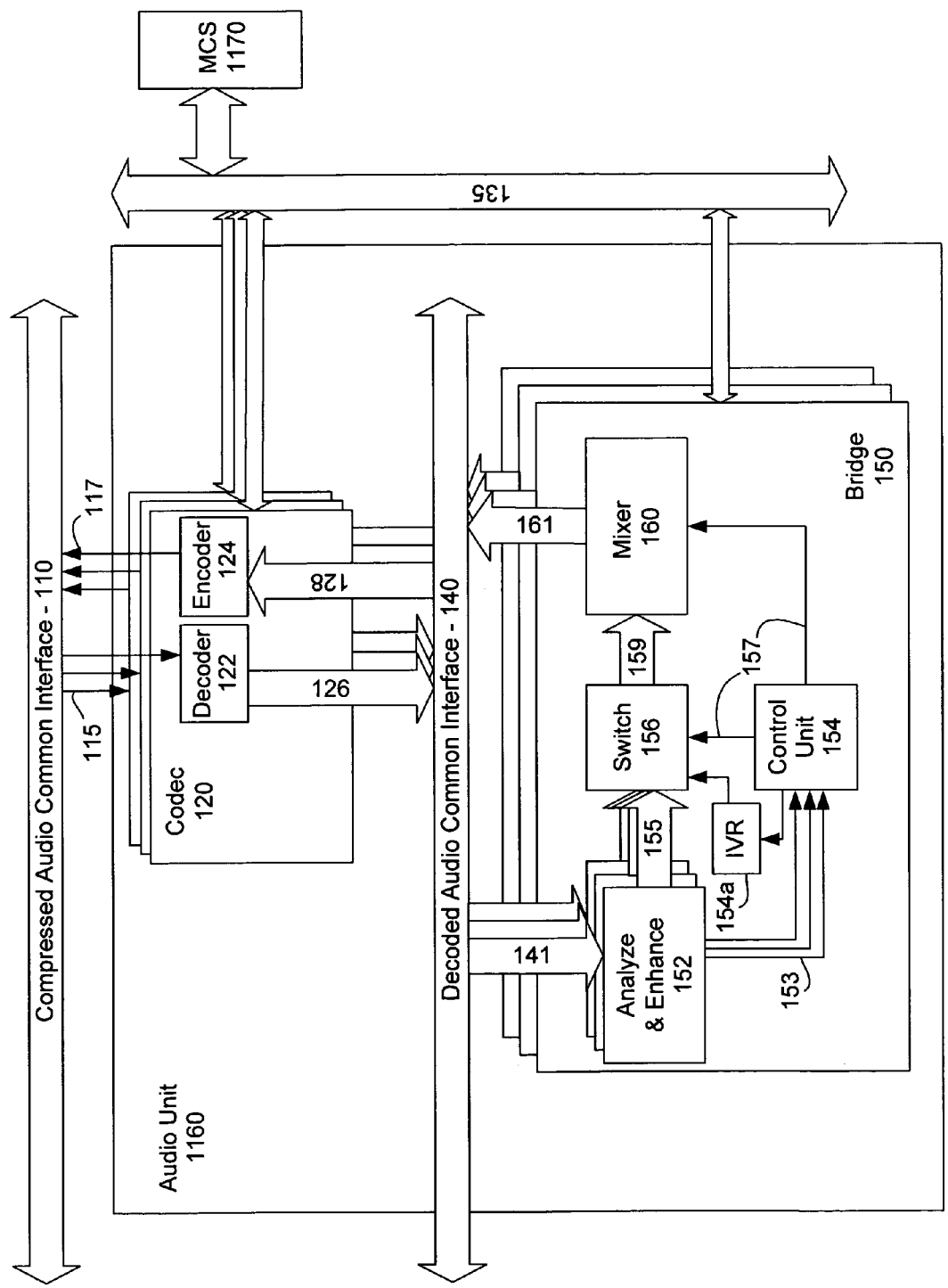
FIG. 1B is a block diagram of an embodiment according to the invention, including a general description of an audio unit in an MCU.

FIG. 1B is an exemplary block diagram of an embodiment of a general audio unit 1160 using an embodiment of the present invention, as well as other structures related to the audio unit. As shown, the audio unit 1160 couples to a Compressed Audio Common Interface (CACI) 110, and a control bus 135 in communication with the MCS 1170. The audio unit 1160 has compressed signals 115 and 117 sent to and from it by the CACI 110, a codec 120, decoded information 126, a mixed output 128, a Decoded Audio Common Interface (DACI) 140, and a bridge 150. The codec 120 includes a decoder 122 and an encoder 124, while the bridge 150 includes Analyze and Enhance (A&E) units 152, information signals 153, a control unit 154, an IVR unit 154a, a switch 156, control signals 157, selected signals 159, a mixer 160, and mixed signals 161.

FIG. 1B describes the flow of audio streams in one example of the present invention. Compressed audio streams from all endpoints connected to the MCCU are transferred over the Compressed Audio Common Interface (CACI) 110. The MCS 1170 may allocate a codec 120 to each one of the endpoints 1110aa-nk (FIG. 1A). The CACI 110 carries signals to and from endpoints 1110*aa-nk*. For example, the compressed signal 115 from one of the endpoints 1110*aa-nk* is routed through the CACI 110 to the decoder 122 in the codec 120, which was previously allocated to that endpoint by the MCS 1170 via control bus 135. The decoder 122 may be a logical unit comprised of software and/or hardware, and may decode a compressed audio stream 115 in accordance with communication standards such as, but not limited to, G.711, G.723.1, G.728, G.729, MPEG or relay uncompressed audio. The decoder 122 then broadcasts the decoded signal 126 over the Decoded Audio Common Interface (DACI) 140. The DACI 140 is a bus that may have broadcasting capabilities, and may be implemented for example by Time Division Multiplexing (TDM), Asynchronous Transmission Mode (ATM), Local Area Network (LAN), wireless technology, or shared memory, or any combination of these. An appropriate bridge 150 may then grab the decoded signal from the DACI 140 and may analyze, enhance, and/or mix the decoded signal and return the output 161 to the DACI 140.

The encoder 124 may also be a logical unit, and generally the encoder 124 compresses the output 128 of the appropriate bridge 150 to form a compressed audio stream or signal 117 based on an appropriate communication standard such as, but not limited to, G.711, G.723.1, G.728, G.729, and/or Motion Picture Expert Group (MPEG).

The MCS 1170 may use a database that holds the connection parameters (e.g., codecs and bridges, etc.) and the connection status (e.g., normal, muted, etc.) of each endpoint (participant) that is currently connected to the MCCU, and for every conference that is currently managed by the MCCU. The Mute (M) connection status means that the participant cannot be heard in the conference. The Normal (N) connection status means that the participant can be heard and can listen to the conference, etc. According to the database, the MCS 1170 programs one or more bridges 150 to grab from the DACI 140 the decoded signals of all the participants associated with a conference assigned to those bridges 150.

The decoded output 126 of any codec 120 can be grabbed by more than one bridge 150, allowing the participants to be associated with more than one conference. The decoded streams from the decoders 122 on the DACI 140 may be grabbed by the bridge 150 and then analyzed and enhanced by the A&E unit 152. The A&E unit 152 may be a logical unit, and may include a set of algorithms for analyzing an audio stream of a participant and/or enhancing its quality, such as, but not limited to, International Telecommunications Union (ITU) G.165 (echo canceling), Dual Tone Multi-Frequency (DTMF) detection, DTMF suppression, signal energy analysis, or nuisance signal analysis, and may include a Voice Activity Detector (VAD).

The bridge 150 may have one or more A&E units 152. Each A&E unit 152 is assigned to a single participant and is programmed according to the connection status of that participant in the conference. The control unit 154 controls a conference, and receives all signals from the A&E unit 152 to select the participants that will be routed via switch 156 to the mixer 160. The control unit 154 may implement an exemplary method of the present invention, described in further detail below with respect to FIGS. 2A & 2B, by utilizing the analysis signals 153 coming from A&E units 152 and controlling the IVR module 154*a* and switch 156 appropriately. A single bridge 150 may serve a conference, a group of conferees or a single conferee. In the last two cases, more than one bridge 150 may be involved in the conference.

The mixer 160 receives the enhanced streams from all of the selected participants and/or the signal from IVR 154*a*, and supplies each participant with an uncompressed mixed audio stream of the selected participants and/or the signal IVR 154*a*. Mixer 160 may supply more than one stream 161, each stream having a different mix.

As just noted, signals 153 from the A&E unit 152 are sent to the control unit 154 and the enhanced decoded audio signals 155 are sent from the A&E units 152 to the switch unit 156. The switch unit 156 is a selector that receives the decoded streams from all the participants in a conference as well as the IVR unit 154*a* and transfers the selected streams to mixer 160. The selection is based on the decisions of the control unit 154. The decisions of the control unit 154, in turn, are based on received commands from the MCS 1170 (which define the connection status of the participants in the conference that are assigned to the bridge 150) and the information signal 153 from the A&E unit 152. The control unit 154 controls, via control signals 157, the switch 156 and the mixer 160. For example, in a case where a participant's connection status is Normal (N), the A&E unit 152 associated with that participant may indicate that the voice signal meets a certain criteria such as set forth by VAD, for example, that the signal energy level is above a certain value. Then, the control unit 154 via switch 156 selects the output 155 of the A&E unit 152 assigned to the participant as one of the inputs to the mixer 160.

Figure 2A:
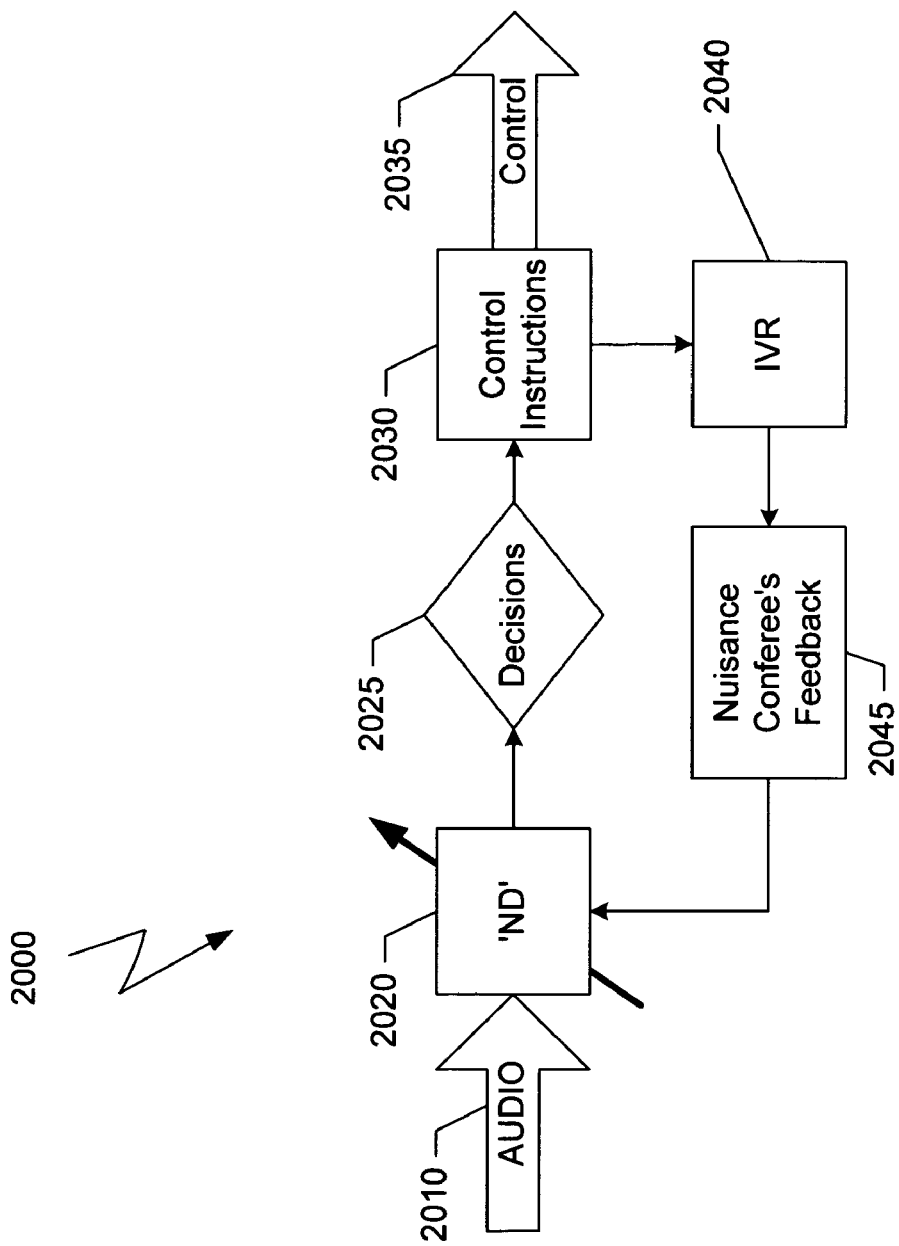
FIG. 2A is a block diagram of an ND that operates according to an exemplary embodiment of the present invention.
Figure 2B:
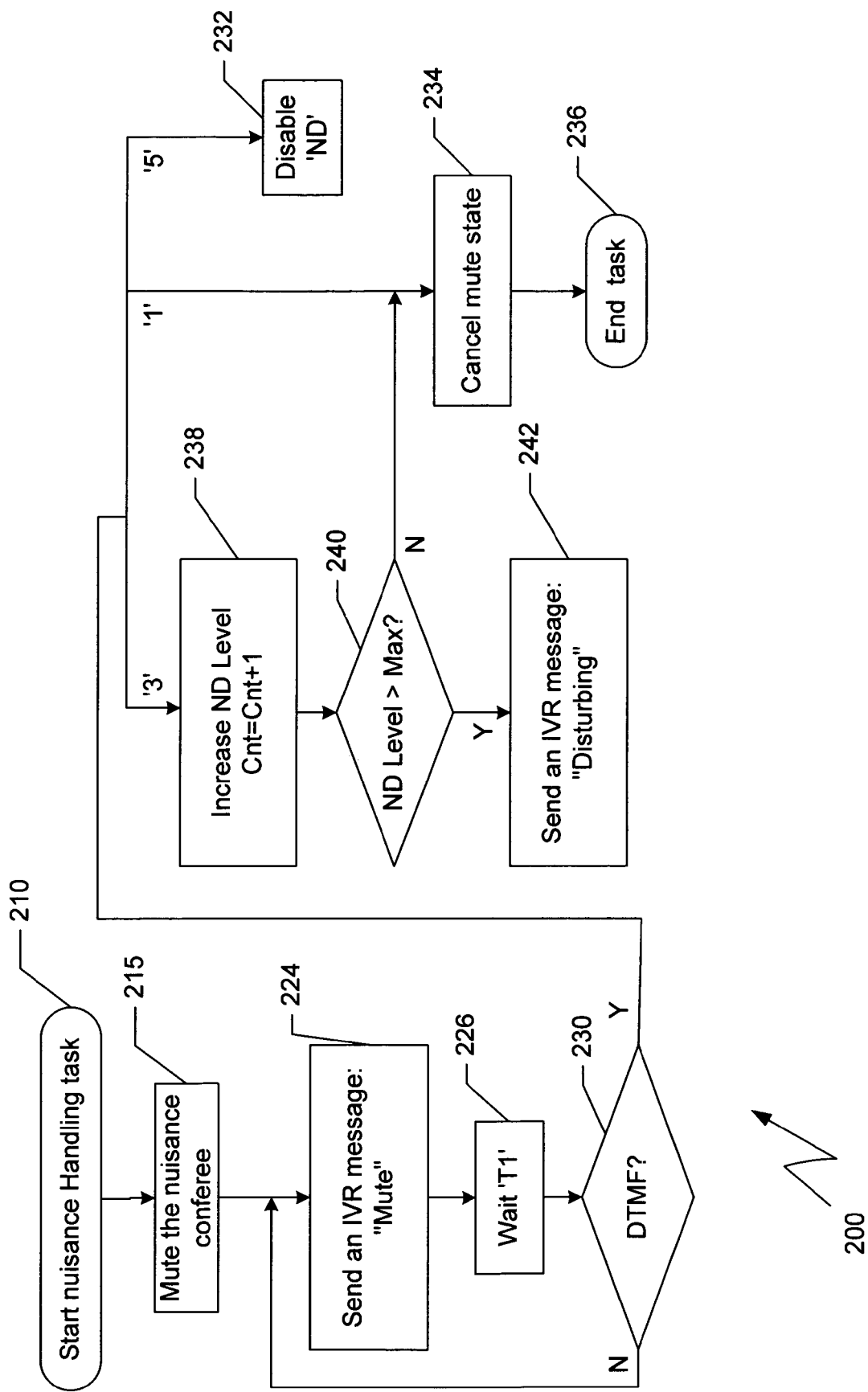
FIG. 2B is a flow diagram showing the steps of an exemplary method for handling of a nuisance participant.

In another case, the A&E unit 152 associated with a participant may indicate to the control unit 154 that the participant signal is nuisance, in which case the control unit 154 may initiate an exemplary embodiment of the present invention as illustrated in FIGS. 2A & 2B, discussed below. Generally, the control unit 154 may instruct the switch 156 to remove the audio signal 155 that belongs to this nuisance conferee from the mixer 160 of all the other participants, placing the nuisance conferee in Mute state. In parallel, the control unit 154 may instruct switch 156 to select the IVR 154*a* output as the input to the mixer of the nuisance participant.

In an alternate embodiment (not shown in the drawings) the output of the IVR unit may be delivered directly to the DACI, in which case the encoder of the nuisance conferee is instructed to grab the IVR's signal from the DACI instead of the output of the appropriate mixer.

The mixer 160 mixes the selected audio signals to form the mixed signals 161, and broadcasts the mixed signals 161 over the DACI 140. Some embodiments of the bridge 150 have the capability of eliminating the voice of a speaker from the mixed signal that is directed to the endpoint of that speaker. Control unit 154 may update the MCS 1170 with the new situation of the nuisance conferee.

The MCS 1170, based on the connection status stored in the database, commands one or more codecs 120 to grab the mixed output 128 from the DACI 140, after which the encoder 124 encodes the decoded signal from the appropriate bridge 150, and sends the compressed signal 117 via the CACI 110 to the appropriate participant.

The codecs 120 and the bridges 150 may be implemented by Digital Signal Processors (DSPs) such as, but not limited to, Texas Instruments DSP TMS320C31. One DSP can include more than one unit, i.e., more than one codec and/or bridge. In the above example, the codec 120 handles a single participant's audio signal, and the bridge 150 handles one conference or part of a conference.

Referring now to FIG. 2A, which is a block diagram of an exemplary embodiment, Nuisance Detector (ND) 2020 is an adjustable ND that may be part of the A&E unit 152 of FIG.

1B. In the exemplary embodiment, each ND 2020 unit is associated with a single conferee. The ND 2020 uses a nuisance algorithm with a current set up and a current parameters set. The ND 2020 sends indications to control unit 154 (FIG. 1B). The control unit 154, based on these indications and existing control information, reaches decisions 2025. According to those decisions, the control unit 154 sends control instructions 2030 that influence the audio stream to the appropriate conferee. The control instructions may be sent to the mixer 160 or to switch 156 (FIG. 1B). In parallel, an IVR message 2040 may be sent to the nuisance conferee requesting feedback. Upon receiving feedback from the conferee, the control unit 154 tunes/adjusts the ND by updating its parameters.

FIG. 2B is a flowchart depicting an exemplary method 200 according to the present invention for handling a nuisance conferee by the exemplary control unit 154 (FIG. 1B). Upon receiving a ND indication from a certain A&E unit 152, control unit 154 starts the nuisance handling task (210). First, to eliminate the nuisance from the rest of the participants, control unit 154 places the nuisance participant into a Mute state (215). As part of this step, the control unit 154 instructs switch 156 to prevent the audio signals 155 that belong to this nuisance conferee from the appropriate mixer 160.

The control unit then instructs the IVR 154a to send a "Mute" message to the nuisance conferee (224). In parallel, and for as long as the IVR message is active, the switch 156 is instructed to select the input of the IVR unit 154a as the only input to a mixer 160 that is associated with the nuisance conferee. An exemplary "Mute" message may be: "Please be aware that you have been muted. Please press '1' upon returning from 'Hold'. Please press '3' if you were not in hold."

Other exemplary embodiments may offer other or additional options. For example, an additional option may be added to allow the ND algorithm to be disabled, such as: "Please press '5' to disable the ND algorithm," etc.

At the end of the message the control unit may wait for a period 'T1' (226). Period 'T1' may be in the range of a few hundreds milliseconds to several seconds, and exemplary values of 'T1' may be 800 milliseconds, 2 seconds, etc. At the end of the waiting period, the control unit verifies 230 whether a DTMF signal has been identified by the A&E unit 152 that is associated with the nuisance conferee. If no DTMF signal has been received, which may reflect that the nuisance conferee is not listening to the conference, then the control unit returns to step 224 and continues the mute decision. Such a case may happen if the nuisance conferee has put the conference call on hold or has been disconnected, in which case there is no harm to either the nuisance conferee or to the rest of the participants. The loop comprising steps 224, 226 and 230 may continue until a DTMF signal is received. If no DTMF signal is received or a DTMF signal other than '1,' '3,' or '5' has been received, the loop may continue until the end of the conference. Other embodiments may add a counter that counts the number of cycles and may disconnect the nuisance conferee after a certain number of cycles.

If a DTMF signal has been received such as a '1,' indicating that the nuisance conferee has returned to the conference, then control unit 154 (FIG. 1B) instructs 234 the appropriate switch 156 to enable the audio signal 155 associated with the nuisance conferee and to disconnect the IVR unit 154a from the appropriate mixer. Then the task is terminated 236.

If a DTMF signal has been received such as a '3,' indicating that the nuisance conferee is listening to the conference, the received ND indication may be due to a noisy connection or noisy environment. Then, the level of the threshold of the ND 2020 is increased (238), which reduces the sensitivity to noise. Thus, the present invention may set the initial threshold level to a low level, but based on the feedback from a nuisance conferee, the setup can be adjusted to suit the current connection.

Different embodiments of the present invention may utilize different methods for increasing the threshold level. One exemplary method may increase the level by a certain percentage from the current level each time, 10%, 30%, and 50%, for example. Other methods may use a fixed value increase, or may change the values according to the value of a counter ("Cnt"), etc. In embodiments using a counter, the counter is reset during the initiation of the conference and the value of the counter is increased by one each time that the conferee has been identified as a nuisance, as specifically shown at step 238 in FIG. 2B.

At step 240, a decision is made whether the nuisance conferee is a disturbing one. If the nuisance conferee is defined as a disturbing conferee, the Mute state of the conferee will be kept for the rest of the conference. If not, the Mute state may be canceled. An exemplary embodiment may compare the new ND level to a predefined maximum level, "Max" (240). The Max value is a parameter that may be set during the set up of the conference or may be a default value above which noise is deemed disturbing, such that it is deemed better to permanently mute the nuisance conferee. Other embodiments may make a decision based on the value of the counter (Cnt), such that if the value of the counter has been increased a certain number of times, it indicates that the connection and the conferee are disturbing.

If the connection is not deemed a disturbing connection at step 240, for example because the ND level is below Max, then the mute state is canceled 234, and the task is terminated 236. The task may be restarted if a new ND indication is received, and this time the value of the counter will be other than zero.

If the connection is deemed a disturbing connection at step 240, for example because the ND level is above Max, then the exemplary embodiment of the present invention may retain the mute state of the nuisance conferee and allow the nuisance conferee to only listen to the conference. At step 242, the IVR module 154a (FIG. 1B) is instructed to send a message indicating that the conferee has been deemed a disturbance, such as: "Please be aware that you have been muted. In case you want to speak, please dial in again."

Other embodiments may offer the conferee the option to disconnect the current connection and re-try again, or may request human assistance to decide how to proceed with the nuisance conferee.

If a DTMF signal has been received such as a '5,' this indicates that the nuisance conferee has requested to disable the ND 2020. Such a request may be appropriate when the involvement of this conferee is crucial in this conference and he/she must be heard even though the connection is noisy. In such a case, the control unit disables the ND 2020 and cancels the mute condition of the nuisance conferee (232).

Alternate embodiments of the present invention may use feedback other than DTMF tones to allow the conferee to respond, such as but not limited to, voice recognition, network control signals such as ISDN 'D' channel signals, control packets over IP communication, etc.

The present invention may handle more that one nuisance conferee. For each nuisance conferee, a dedicated task such as that disclosed herein may be initiated.

In this application the words "unit" and "module" are used interchangeably. Anything designated as a unit or module may be a stand-alone unit or a specialized module. A unit or a module may be modular or have modular aspects allowing it to be easily removed and replaced with another similar unit or module. Each unit or module may comprise software, hardware, or firmware, and combinations of these.

Embodiments of this invention will improve the quality of a conference by handling a nuisance conferee automatically, and by allowing feedback from the nuisance conferee that improves the automatic decision. Moreover, the process is transparent to the rest of the conferees.

The present invention has been described using detailed descriptions of embodiments thereof that are provided by way of example and are not intended to limit the scope of the invention. The described embodiments comprise different features, not all of which are required in all embodiments of the invention. Some embodiments of the present invention utilize only some of the features or possible combinations of the features. Variations of embodiments of the present invention that are described and embodiments of the present invention comprising different combinations of features noted in the described embodiments will occur to persons of the art. The scope of the invention is limited only by the following claims.

The invention claimed is:

1. A method for improving the quality of a conference between a plurality of conferees, comprising:
    identifying a conferee as a nuisance conferee if a nuisance level of an audio stream of that conferee exceeds a nuisance detection threshold;
    muting the nuisance conferee from the conference;
    requesting a feedback from the nuisance conferee, wherein the feedback indicates selecting an option from among:
        (i) reconnecting to the conference from "HOLD";
        (ii) remaining connected to the conference via a noisy connection; and
        (iii) disabling the algorithm to unmute the nuisance conferee; and
    in response to such feedback, changing the nuisance detection threshold for the nuisance conferee if option (ii) is selected.

2. The method of claim 1, further comprising unmuting the nuisance conferee if the nuisance level of the audio stream is less than the changed nuisance detection threshold.

3. The method of claim 1, further comprising continuing to mute the nuisance conferee if the nuisance level of the audio stream exceeds a maximum level.

4. The method of claim 1, wherein requesting a feedback from the nuisance conferee comprises sending a voice message to the nuisance conferee.

5. The method of claim 1, wherein the feedback comprises a voice message from the nuisance conferee.

6. The method of claim 1, wherein the feedback comprises a press of a button at a terminal of the nuisance conferee.

7. The method of claim 6, wherein the button generates a DTMF tone.

8. The method of claim 6, wherein the button generates at least one network control signal selected from a group consisting of an ISDN 'D' channel signal and a control packet over IP communication.

9. The method of claim 1, wherein changing the nuisance detection threshold for the nuisance conferee comprises increasing a nuisance detection threshold pertinent only to the nuisance conferee.

10. A method for improving the quality of a conference between a plurality of conferees, comprising:
    assessing an audio stream of a conferee to determine if it comprises a nuisance, in turn considering that conferee as a nuisance conferee;
    using an algorithm to mute the nuisance conferee from the conference;
    requesting a feedback from the nuisance conferee, wherein the feedback indicates selecting an option from among:
        (i) reconnecting to the conference from "HOLD";
        (ii) remaining connected to the conference via a noisy connection; and
        (iii) disabling the algorithm to unmute the nuisance conferee.

11. The method of claim 10, wherein requesting a feedback from the nuisance conferee comprises sending a voice message to the nuisance conferee.

12. The method of claim 10, wherein the feedback comprises a voice message from the nuisance conferee.

13. The method of claim 10, wherein the feedback comprises a press of a button at a terminal of the nuisance conferee.

14. The method of claim 13, wherein the button generates a DTMF tone.

15. The method of claim 13, wherein the button generates at least one network control signal selected from a group consisting of an ISDN 'D' channel signal and a control packet over IP communication.

16. The method of claim 10, wherein the option is (i) and wherein the method further comprises unmuting the nuisance conferee.

17. The method of 10, wherein the option is (ii) and wherein the method further comprises reducing the sensitivity of the algorithm.

18. The method of 10, wherein the option is (ii) and wherein the method further comprises placing the nuisance conferee in push to talk mode.

19. The method of claim 10, wherein the option is (iii) and wherein the method further comprises disabling the algorithm.

20. The method of claim 19, wherein the algorithm is only disabled for the nuisance conferee.

21. A multipoint control unit for controlling a conference between a plurality of conferees, comprising:
    an analysis unit, wherein the analysis unit assesses audio signals from the conferees to identify a conferee as a nuisance conferee if a nuisance level of an audio stream of that conferee exceeds a nuisance detection threshold, and for sending information concerning the same to the control unit;
    a control unit, wherein the control unit controls a mixer so as to mix the audio signals for those conferees not identified as nuisance conferees and so as to mute the identified nuisance conferee; and
    a response unit, wherein the response unit in response to the control unit requests a feedback from the identified nuisance conferee, wherein the feedback indicates selecting an option from among:
        (i) reconnecting to the conference from "HOLD";
        (ii) remaining connected to the conference via a noisy connection; and (iii) disabling the algorithm to unmute the nuisance conferee;
wherein the feedback received from the nuisance conferee changes the nuisance detection threshold for the nuisance conferee if option (ii) is selected.

22. The multipoint control unit of claim 21, wherein the control unit control the mixer so as to unmute the nuisance conferee if the nuisance level of the audio stream is less than the changed nuisance detection threshold.

23. The multipoint control unit of claim 21, wherein the control unit continues to mute the nuisance conferee if the nuisance level of the audio stream exceeds a maximum level.

24. The multipoint control unit of claim 21, wherein requesting a feedback from the nuisance conferee comprises sending a voice message to the nuisance conferee.

25. The multipoint control unit of claim 21, wherein the feedback comprises a voice message from the nuisance conferee.

26. The multipoint control unit of claim 21, wherein the feedback comprises a press of a button at a terminal of the nuisance conferee.

27. The multipoint control unit of claim 26, wherein the button generates a DTMF tone.

28. The multipoint control unit of claim 26, wherein the button generates at least one network control signal selected from a group consisting of an ISDN 'D' channel signal and a control packet over IP communication.

29. The multipoint control unit of claim 21, wherein changing the nuisance detection threshold for the nuisance conferee comprises increasing a nuisance detection threshold pertinent only to the nuisance conferee.

30. A multipoint control unit for controlling a conference between a plurality of conferees, comprising:
an analysis unit, wherein the analysis unit assesses audio signals from the conferees to identify a conferee as a nuisance conferee, and for sending information concerning the same to the control unit;
a control unit, wherein the control unit uses an algorithm to control a mixer so as to mix the audio signals for those conferees not identified as nuisance conferees and so as to mute the identified nuisance conferee; and
a response unit, wherein the response unit in response to the control unit requests a feedback from the identified nuisance conferee, wherein the feedback comprises selecting an option from among:
(i) reconnecting to the conference from "HOLD";
(ii) remaining connected to the conference via a noisy connection, and
(iii) disabling the algorithm to unmute the nuisance conferee.

31. The multipoint control unit of claim 30, wherein requesting a feedback from the nuisance conferee comprises sending a voice message to the nuisance conferee.

32. The multipoint control unit of claim 30, wherein the feedback comprises a press of a button at a terminal of the nuisance conferee.

33. The multipoint control unit of claim 32, wherein the button generates a DTMF tone.

34. The multipoint control unit of claim 32, wherein the button generates at least one network control signal selected from a group consisting of an ISDN 'D' channel signal and a control packet over IP communication.

35. The multipoint control unit of claim 30, wherein the feedback comprises a voice message from the nuisance conferee.

36. The multipoint control unit of claim 30, wherein the algorithm is only disabled for the nuisance conferee.

* * * * *

UNITED STATES PATENT AND TRADEMARK OFFICE
CERTIFICATE OF CORRECTION

| | | |
|---|---|---|
| PATENT NO. | : 7,269,252 B2 | Page 1 of 1 |
| APPLICATION NO. | : 10/636909 | |
| DATED | : September 11, 2007 | |
| INVENTOR(S) | : Knaz Eran | |

It is certified that error appears in the above-identified patent and that said Letters Patent is hereby corrected as shown below:

In Column 10, Claim 17, Line 37:

Insert --claim-- between "of" and "10"

In Column 10, Claim 18, Line 40:

Insert --claim-- between "of" and "10"

In Column 11, Claim 22, Line 7:

"control" (second occurrence) is changed to --controls--

Signed and Sealed this

Fourth Day of December, 2007

JON W. DUDAS
*Director of the United States Patent and Trademark Office*